Nov. 3, 1953 R. B. GIBSON 2,657,629
WHISKEY AGING VAT
Filed March 17, 1949
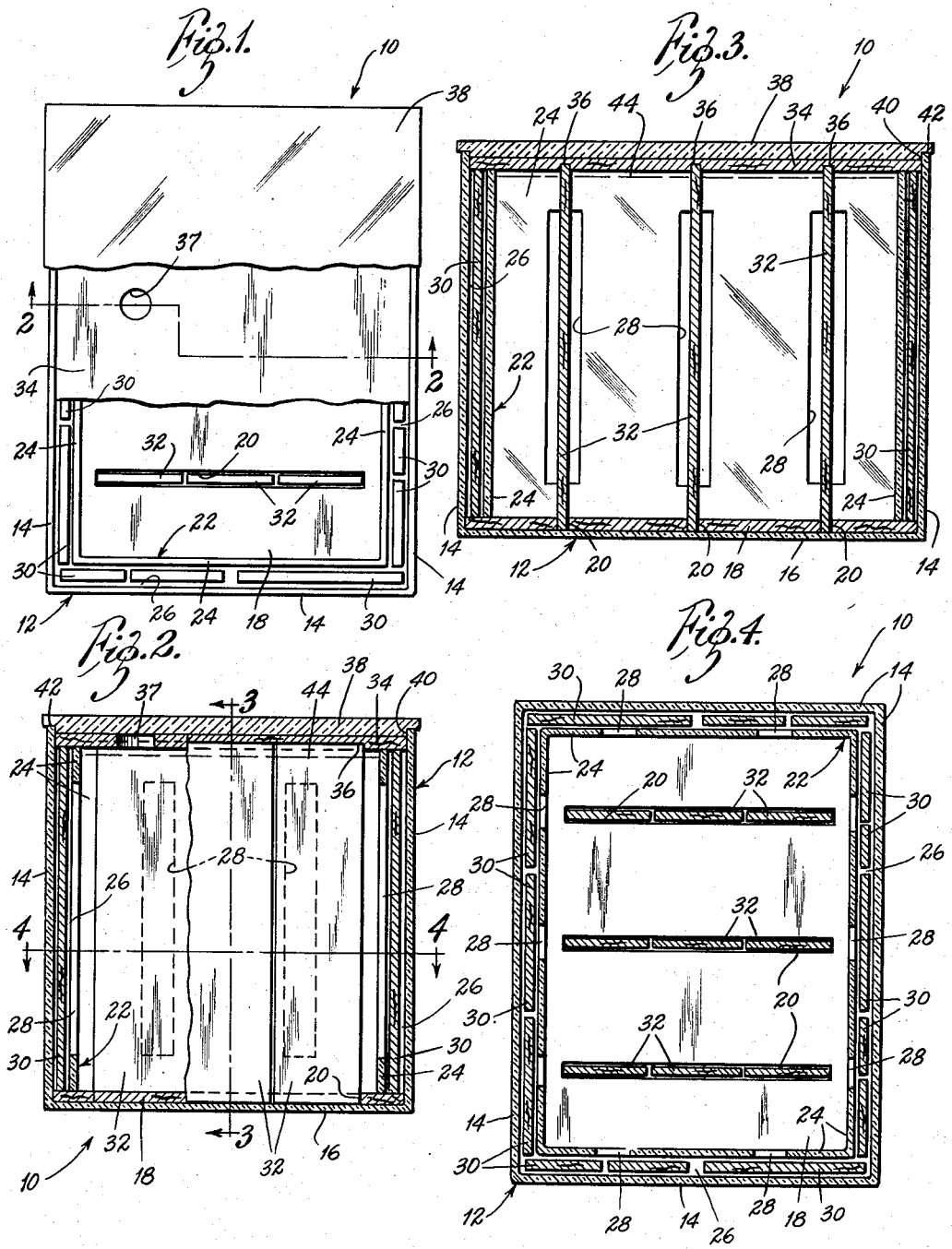
INVENTOR:
RICHARD B. GIBSON,
BY Rogers & Ezell,
ATTORNEYS.

Patented Nov. 3, 1953

2,657,629

UNITED STATES PATENT OFFICE 2,657,629

WHISKY AGING VAT

Richard B. Gibson, Glencoe, Mo.

Application March 17, 1949, Serial No. 81,955

8 Claims. (Cl. 99—277.1)

The present invention relates generally to the container art, and more particularly to a novel vat for aging whiskey, which, in its preferred form, comprises a glass container with white oak members positioned therein.

As is well known to those familiar with the art, the better whiskies are aged in white oak casks. The white oak used in the manufacture of these casks must be select wood, free from knots and similar defects, and the usual practice is to use only that portion of the tree between the ground and the lowest branches, the remainder of the tree being discarded. Because of this and other requirements, such as the special shape of the stave bolts, white oak casks for aging whiskey have always been very expensive. Also, in recent years, the white oak forests have been nearly depleted, so that suitable white oak timber has become very scarce, thereby further increasing the cost of casks.

Much experimentation has been conducted in an attempt to find a suitable substitute for native white oak for aging whiskey, but none has been very successful.

It is an object of the present invention, therefore, to provide a novel vat for aging whiskey which utilizes white oak which heretofore has been discarded because of its shape or structural defects.

Another object is to provide a vat for aging whiskey which can be manufactured at a small fraction of the cost of the white oak casks in use at the present time.

Another object is to provide a vat for aging whiskey, the main portions of which can be continuously reused.

Another object is to provide a novel vat for aging whiskey which utilizes white oak lumber cut in standard sizes.

Another object is to provide a vat for aging whiskey which has more surface area of white oak exposed to the whiskey than a cask of conventional design constructed to hold the same amount of liquor.

Further objects and advantages of the present invention will be apparent from the following description, reference being had to the accompanying drawings wherein a preferred embodiment of the present invention is shown, in which:

Fig. 1 is a top plan view of a vat made in accordance with the teachings of the present invention with various portions thereof cut away to show the inner construction;

Fig. 2 is a vertical transverse sectional view taken on the line 2—2 in Fig. 1;

Fig. 3 is a vertical longitudinal sectional view taken on the line 3—3 in Fig. 2; and Fig. 4 is a horizontal sectional view taken on the line 4—4 in Fig. 2.

Referring to the drawing more particularly by reference numerals 10 indicates generally a vat made in accordance with the teachings of the present invention. It includes an open top container 12 of glass or like material which has side walls 14 and a bottom wall 16.

A flat white oak board 18 of rectangular shape and containing a series of spaced elongated slots 20 is disposed in the bottom of the container 12.

A sleeve-like member 22 of glass or like material having side walls 24 is disposed within the container 12 on top of the bottom board 18. The outer dimensions of the sleeve-like member 22 are slightly smaller than the inner dimensions of the container 12 so as to provide a space 26 around the former between it and the inner faces of the container side walls 14. As shown in Fig. 2, the upper edges of the sleeve walls 24 are slightly below the upper edges of the container walls 14. A series of spaced vertical slots 28 are contained on the sleeve walls 24.

A series of flat elongated white oak boards 30, not necessarily of the same width, are positioned in the space 26. The thickness of the members 30 is a little less than the distance between the sleeve walls and the container walls so as to permit the members to expand when wet without their pressing against the inner surface of the container walls 14, or the outer surface of the walls 24.

Another series of flat elongated white oak boards 32, not necessarily the same width, are positioned within the sleeve-like member 22 with the lower ends thereof disposed in the slots 20. As is shown in Fig. 3, the upper ends of the boards 32 extend slightly above the upper edges of the walls 24.

A flat white oak board 34 of rectangular shape is disposed on top of the sleeve-like member 22 with its outer edges abutting the inner faces of walls 14. A series of spaced elongated grooves 36 are contained in the underside of the board 34. The grooves 36 are equal in number to the slots 20, are of substantially the same size, and are directly above the slots 20 so that the upper ends of the boards 32 are positioned therein when the boards 32 extend vertically upward as shown in Fig. 3. An opening 37 is contained in the board 34 approximately midway between two of the grooves 36.

A flat cover 38 of glass or like material is disposed on top of the container 12. The cover 38 has a step-like groove with vertical portions 40 and horizontal portions 42 formed in the outer edges thereof. As is shown in Figs. 2 and 3, the vertical portions 40 abut the inner face of the walls 14 and the bottom surface of the cover 38 bears against the upper surface of the top board 34 so as to maintain it in position.

In use, the container 12 is positioned so that it rests on the bottom wall 16. The lower board 18 is placed in the bottom of the container 12 and the sleeve-like member 22 then positioned on top of it so as to provide a continuous space 26 around the sleeve-like member as described above. The outer boards 30 are then inserted in the space 26 between the container 12 and the sleeve-like member 22. The bottom ends of the inner boards 32 are positioned in the slots 20 with the upper portions extending vertically upward. The upper board 34 is then placed on top of the upper edges of the walls 24 with the upper ends of the boards 32 positioned in the grooves 36.

Then, with the upper board 34 held down with a weight (not shown), the whiskey is pumped or poured into the vat 10 through the opening 37 until it reaches the approximate level indicated at 44. The weight prevents the upper board 34 from being lifted off by the force of the boards 30 and 32 attempting to float upwardly.

After the vat has been filled to the desired level, the cover 38 is placed on top of the container 12 simultaneously with the removal of the weight (not shown). The cover 38 is heavy enough to remain in position regardless of the upward force of the boards 30 and 32.

The whiskey passes through the slots 28 so as to be in intimate contact with both the inner and outer surfaces of the boards 30 so that, with these boards alone, substantially twice as much wood surface is exposed to the whiskey as where a conventional cask of the same size is used. Consequently, when both the outer boards 30 and the inner boards 32 are used, it is manifest that the square feet of white oak exposed to the whiskey is many times that of a conventional cask.

After the whiskey has aged sufficiently, it can be pumped out, or, if desirable, the container 12 can be initially provided with an opening in the lower portion of a side wall 14 through which the liquor may be drained.

It is apparent that it is immaterial whether the white oak boards 30 and 32 are removed before or after the whiskey is removed.

After the liquor has been removed and the white oak boards removed and discarded, the container 12, the sleeve-like member 22, and the cover 38 are cleaned preparatory to their being re-used.

As will be noted from the drawing, the container 12, the sleeve-like member 22, and the cover 38 are of simple design and can be produced at a relatively low cost, and, as described above, structurally imperfect white oak boards of various widths can be used so that the cost of aging whiskey with the vat constructed in accordance with the teachings of the present invention is a small fraction of the cost resulting from using a cask of conventional design.

It is to be understood that the container can be of any size or shape, and that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. A device of the type described for aging whiskey, comprising a container of material inert to whiskey having an opening in the upper portion thereof and containing at least one wall, a perforated sleeve-like member of inert material disposed within said container so as to provide a space between it and the wall of the container in communication with the interior of said container, and white oak members disposed within said space adapted to be in free contact with whiskey which may be placed therein for proper aging thereof.

2. A device of the type described for aging whiskey, comprising a container of material inert to whiskey having an opening in the upper portion thereof and containing at least one wall, a perforated sleeve-like member of inert material disposed within said container so as to provide a space between it and the wall of the container in communication with the interior of said container, white oak members freely disposed within said space adapted to be in free contact with whiskey which may be placed therein for proper aging thereof, and closure means covering the opening in the container and limiting the upward movement of the white oak members.

3. A device of the type described for aging whiskey, comprising a container having an opening in the upper portion thereof and containing at least one wall, yieldable means of white oak disposed in the bottom of the container, a perforated sleeve-like member disposed within the container on top of the yieldable means so as to provide a space between the sleeve-like member and the wall of the container in communication with the interior of said container, white oak members disposed within said space adapted to be in free contact with whiskey which may be placed therein for proper aging thereof, and closure means covering the opening in the container.

4. A device of the type described for aging whiskey, comprising a container having an opening in the upper portion thereof and containing at least one wall, a first flat white oak member disposed in the bottom of the container, a perforated sleeve-like member disposed within the container on top of said white oak member so as to provide a space between the sleeve-like member and the wall of the container in communication with the interior of said container, white oak members positioned freely within said space adapted to be in free contact with whiskey which may be placed therein for proper aging thereof, and a second flat white oak member disposed above the sleeve-like member so as to limit the upward movement of said white oak members within the space.

5. A device of the type described for aging whiskey, comprising a container having an opening in the upper portion thereof and containing at least one wall, a first flat white oak member disposed in the bottom of the container, a perforated sleeve-like member disposed within the container on top of said white oak member so as to provide a space between the sleeve-like member and the wall of the container in communication with the interior of said container, white oak members freely positioned within said space adapted to be in free contact with whiskey which may be placed therein for proper aging thereof, a second flat white oak member disposed above the sleeve-like member so as to limit the upward movement of said white oak members within the space, and closure means covering the opening in the container and bearing against the upper surface of the second white oak member.

6. A device of the type described for aging whiskey, comprising a container having at least one wall, a perforated sleeve-like member disposed within the container so as to provide a space between it and the wall of the container in communication with the interior of said container, a first series of white oak members disposed in said space, and a second series of white oak members positioned within the sleeve-like member adapted to be in free contact with whiskey which may be placed therein for proper aging thereof.

7. A device of the type described for aging whiskey, comprising a container having at least one wall, a perforated sleeve-like member disposed within the container so as to provide a space between it and the wall of the container in communication with the interior of said container, a first series of white oak members freely disposed in said space, and a second series of white oak members positioned within the sleeve-like member adapted to be in free contact with whiskey which may be placed therein for proper aging thereof, and means limiting the upward movement of said white oak members.

8. A device of the type described for aging whiskey, comprising a container having at least one wall; a first flat white oak member disposed in the bottom of the container, said member containing a series of spaced elongated slots; a perforated sleeve-like member disposed within the container on top of the white oak member so as to provide a space between the sleeve-like member and the wall of the container; a series of vertically extending elongated white oak members positioned within said space; another series of vertically extending elongated white oak members positioned within the sleeve-like member, the lower ends of said last-named oak members being disposed in the slots in said flat oak member; and a second flat white oak member disposed on top of the sleeve-like members, said last-named oak member containing a series of spaced grooves in the lower surface thereof; the upper ends of said other series of elongated oak members being disposed in said grooves.

RICHARD B. GIBSON.

References Cited in the file of this patent

UNITED STATES PATENTS

| Number | Name | Date |
|---|---|---|
| 12,210 | McAvoy | Jan. 9, 1855 |
| 34,373 | Reese | Feb. 11, 1862 |
| 235,591 | Toope | Dec. 14, 1880 |
| 582,380 | Tebbutt | May 11, 1897 |
| 970,648 | Sargent | Sept. 20, 1910 |
| 986,835 | Lewis | Mar. 14, 1911 |
| 1,337,278 | Schultz | Apr. 20, 1920 |
| 2,079,378 | Mills | May 4, 1937 |
| 2,105,693 | Jones et al. | Jan. 18, 1938 |
| 2,135,622 | Nagle | Nov. 8, 1938 |
| 2,289,245 | Dant | July 7, 1942 |
| 2,487,594 | Rudnick | Nov. 8, 1949 |